US007218327B2

(12) United States Patent
Kubo et al.

(10) Patent No.: US 7,218,327 B2
(45) Date of Patent: May 15, 2007

(54) FONT MEMORY FOR A DISPLAY

(75) Inventors: Hiroshi Kubo, Kanagawa (JP); Toshio Takahashi, Kanagawa (JP); Yoshihiro Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 173 days.

(21) Appl. No.: 10/792,804

(22) Filed: Mar. 5, 2004

(65) Prior Publication Data

US 2004/0233198 A1 Nov. 25, 2004

(30) Foreign Application Priority Data

Mar. 5, 2003 (JP) ............................. 2003-058409

(51) Int. Cl.
*G06T 11/00* (2006.01)
*G06F 12/02* (2006.01)
*G09G 5/22* (2006.01)

(52) U.S. Cl. ...................... 345/471; 345/543; 345/544; 345/551; 345/467

(58) Field of Classification Search ................ 345/467, 345/471, 549, 551, 543, 544
See application file for complete search history.

(56) References Cited

U.S. PATENT DOCUMENTS 4,724,431 A * 2/1988 Holtey et al. ................. 345/22
4,924,413 A * 5/1990 Suwannukul ............... 345/603
4,984,072 A * 1/1991 Sandrew ....................... 348/34
5,159,320 A 10/1992 Matsuo et al.
5,251,298 A * 10/1993 Nally ......................... 345/568
5,400,053 A * 3/1995 Johary et al. ............... 345/691
5,534,915 A * 7/1996 Sandrew ....................... 348/29
5,557,691 A * 9/1996 Izuta .......................... 382/299
5,699,498 A * 12/1997 Noorbakhsh ................ 345/591
5,721,568 A * 2/1998 Kim ........................... 345/467
5,854,620 A * 12/1998 Mills et al. ................. 345/603
6,140,986 A * 10/2000 Wilkinson et al. ......... 345/74.1
6,344,856 B1 * 2/2002 Lum et al. .................. 345/562
6,512,595 B1 * 1/2003 Toda .......................... 358/1.9
6,630,966 B1 * 10/2003 Tournier ..................... 348/569
6,967,689 B1 * 11/2005 Chu ........................... 348/569

(Continued)

FOREIGN PATENT DOCUMENTS

JP 01042693 A * 2/1989

(Continued)

*Primary Examiner*—Ulka Chauhan
*Assistant Examiner*—Jeffrey J. Chow
(74) *Attorney, Agent, or Firm*—Oblon, Spivak, McClelland, Maier & Neustadt, P.C.

(57) ABSTRACT

A font memory for a display includes a ROM with a storage region divided into a program storing region and a font data storing region, divided into a mono-font data storing region and a color font data storing region, and designed to map and store data in three segment storage regions in the color font data storing region with respect to a character CRA code defining characteristics of color font data. Three segment storage regions in the color font data storing region, in which color font data corresponding to a CRA code, which is not displayed on a screen, of CRA codes of color font data with respect to a specific font, are to be written, have a mono-font storage diversion changeable storage region that stores therein mono-font data with respect to a font other than the specific font.

13 Claims, 5 Drawing Sheets

(a) IN CASE OF 32 MONO-FONT AND 32 COLOR FONT (b) IN CASE OF CHANGING 30 COLOR FONT TO 90 MONO-FONT

U.S. PATENT DOCUMENTS

| | | | | |
|---|---|---|---|---|
| 7,164,431 | B1 * | 1/2007 | Chu et al. | 345/636 |
| 2005/0020361 | A1 * | 1/2005 | Okada et al. | 463/31 |

FOREIGN PATENT DOCUMENTS

| | | | | |
|---|---|---|---|---|
| JP | 04337795 | A | * | 11/1992 |
| JP | 05216447 | A | * | 8/1993 |
| JP | 8-6542 | | | 1/1996 |
| JP | 8-234720 | | | 9/1996 |
| JP | 10-31669 | | | 2/1998 |
| JP | 2001331168 | A | * | 11/2001 |

* cited by examiner

FONT MEMORY FOR A DISPLAY

CROSS REFERENCE TO RELATED APPLICATION

This application is based upon and claims the benefit of priority from the prior Japanese Patent Application No. 2003-058409, filed on Mar. 5, 2003, the entire contents of which are incorporated herein by reference.

BACKGROUND OF THE INVENTION

1. Field of the Invention

The present invention relates generally to a font memory for display. More specifically, the invention relates to a font memory for display, which is capable of changing the number of fonts to be stored in an assigned storage region when an on screen display (which will be hereinafter abbreviated to OSD) font is stored in, e.g., a read-only memory (which will be hereinafter abbreviated to ROM).

2. Discussion of the Background

In general, mono-font data are displayed by single font data since color data are separately assigned and since it is sufficient just to display only a pixel position. On other hand, a color font for OSD is displayed by three font data of red (which will be hereinafter abbreviated to R), green (which will be hereinafter abbreviated to G) and blue (which will be hereinafter abbreviated to B) so that the font can be displayed with full color by changing the position of pixels forming the font and the rate of three colors (R, G, B).

For each of mono-font and color font of the OSD font, a predetermined number of data are stored in a font ROM. Conventional OSD fonts can not change the number of fonts since the number of color fonts and the number of mono-fonts are fixed. In the OSD, there are some cases where the number of mono-fonts to be displayed is insufficient although there is an unused color font. In such cases, the number of mono-fonts can be increased by writing mono-font data, which are to be displayed, in a region of a ROM, in which font data of a color font is to be written. However, as described above, as that the amount of color font data is three times as large as the amount of mono-font data, the data storage region of the ROM is not effectively used.

In some cases of conventional font memories, they could not be provided with any assignment region segments in which mono-fonts and color fonts are to be stored, respectively. For example, discriminate bits for mono-/color fonts are stored in a VRAM for assigning a display font, and an end address for each font is stored in the VRAM. By assigning the discriminate bit and the end address, the data mapping of fonts is treated as a block of data. Such conventional font memories using RAMs can flexibly change the number of mono-fonts and color fonts. In order to achieve this, it is required to previously calculate the number of discriminant bits and the end address to grasp these data.

On the other hand, fonts displayed by OSD are stored in a storage region of a ROM which is assigned by a character code (which will be hereinafter referred to as a CRA code). However, this CRA code has not been used for efficiently storing font data via processing operations, such as an operation for changing the assigned storage region, in view of the difference in data amount between mono-fonts and color fonts, although the CRA code has been used for assigning mono-fonts and color fonts to regions of the ROM.

As described above, in some cases of conventional font memories for display, they could not be provided with any assignment region segments in which mono-fonts and color fonts are to be stored, respectively. In these cases, when a display font is stored in a ROM, three color font data are required for a single mono-font data. Therefore, a storage region in which the mono-font data is to be written is insufficient, so that there is a problem in that the number of mono-fonts capable of being stored is limited.

If the font memory comprises a VRAM, the number of mono-fonts and color fonts can be changed by assigning a discriminant bit and an end address for a mono-font and color font. In order to achieve this, the discriminant bit and the end address must be previously calculated, so that there is a problem in that the processing is complicated.

SUMMARY OF THE INVENTION

A font memory for display according to a basic construction of the present invention comprises a read-only memory, wherein a storage region is divided into a program storing region and a font data storing region which is divided into a mono-font data storing region and a color font data storing region, for mapping and storing data in three segment storage regions in the color font data storing region with respect to a character code which defines characteristics of color font data, wherein three segment storage regions in the color font data storing region, in which color font data corresponding to a character code, which is not displayed on a screen, of character codes of color font data with respect to a specific font, are to be written, have a mono-font storage diversion changeable storage region which stores therein mono-font data with respect to a font other than the specific font.

With the font memory it becomes possible to effectively use a mono-font data storage region in a limited storage range and to store mono-font data in an appropriate portion by carrying out a simple operation.

DETAILED DESCRIPTION OF THE EMBODIMENTS

Figure 1A:
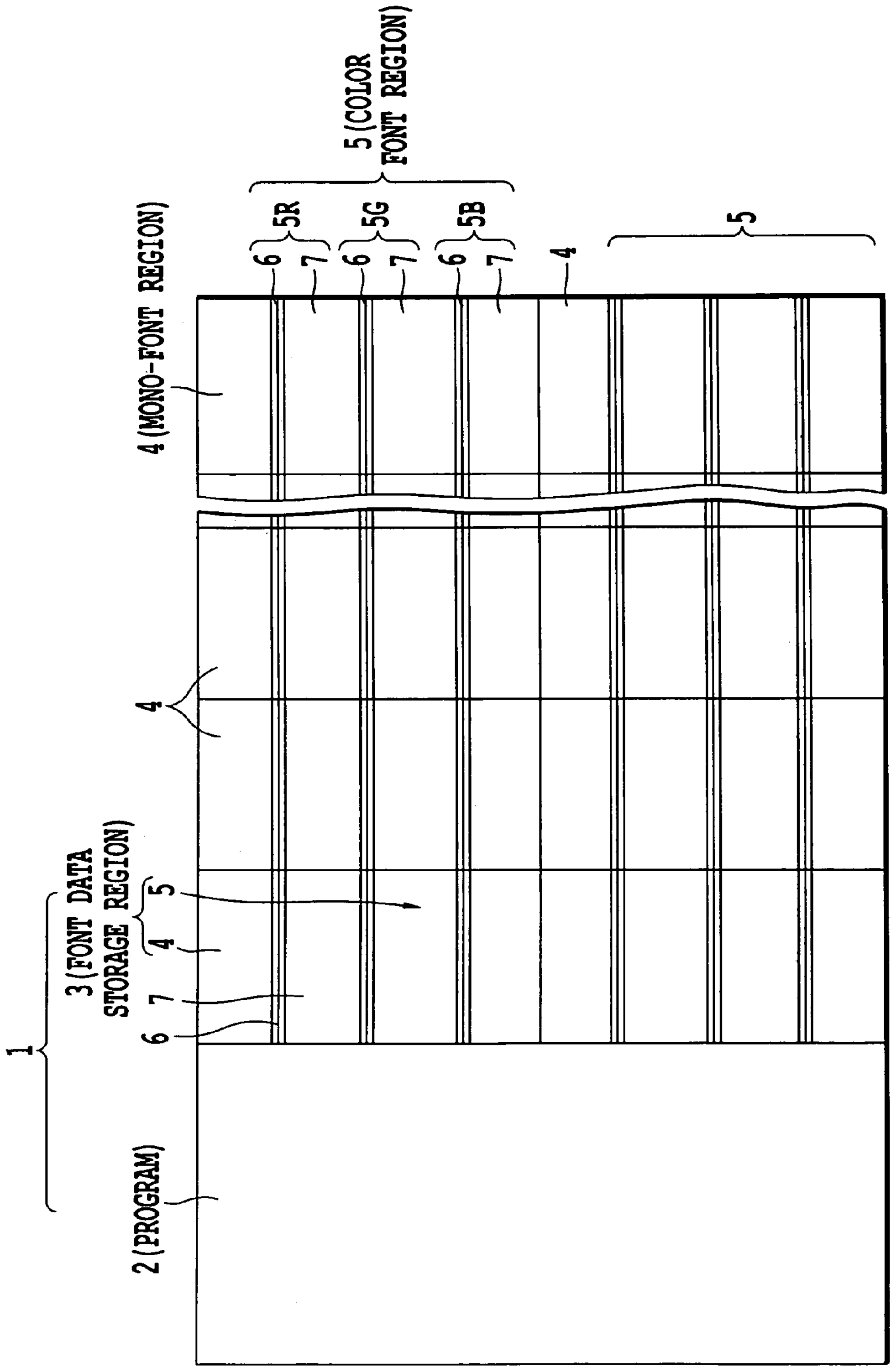
FIGS. 1A and 1B are illustrations schematically showing the arrangement of the first embodiment of a font memory for display according to the invention.
Figure 1B:
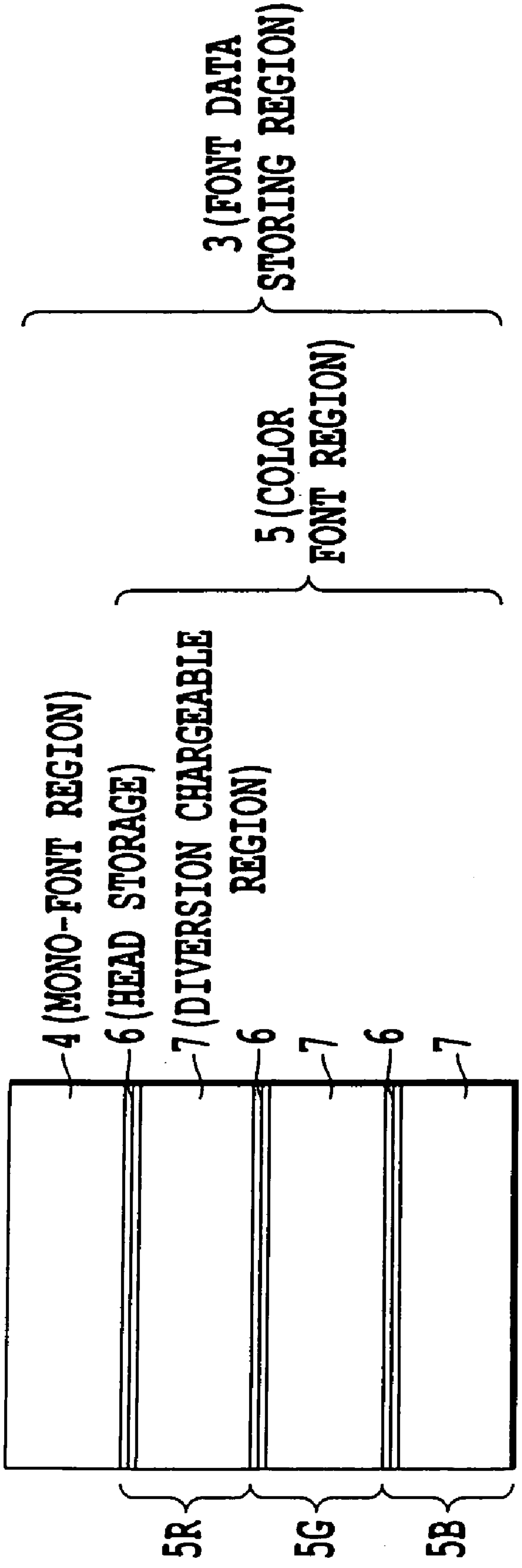

Referring now to the accompanying drawings, the embodiment of a font memory for display according to the present invention will be described below. FIGS. 1A, 1B are illustrations schematically showing a basic construction of the present invention, and schematically shows the arrangement of a storage region of the first embodiment of a font memory for display according to the present invention.

In FIGS. 1A, 1B, a font memory for display 1 in the first embodiment has a storage region which is divided into a program storing region 2 for storing program data and a font data storing region 3 for storing font data (FIG. 1B shows details of the font data storing region in FIG. 1A). The font data storing region 3 of the memory 1 comprises a read-only memory (which will hereinafter referred to as a ROM) which is divided into mono-font data storing regions 4 and color font data storing regions 5, and which maps and stores data in three segment storage regions in the color font storing region with respect to a character code defining characteristics of color font data.

In the font memory for display having the storage region, three segment storage regions 5R, 5G and 5B in the color font storing region 5, in which color font data corresponding to a character code, which is not displayed on a screen, of character codes of color font data with respect to a specific code, are to be written, have a mono-font storage diversion changeable storage region 7 which stores therein mono-font data for a font other than the specific font. Basic color font data are stored in a head storage place 6 of each of the segment storage regions 5R, 5G and 5B.

The mono-font storage diversion changeable storage region 7 is provided in the font data storage region 3 of a read-only memory element, and is diverted from part of the three color font storable segment storage regions 5R, 5G and 5B having an area three times as large as that of mono-font data.

The three segment storage regions 5R, 5G and 5B diverted to the mono-font storage diversion changeable storage region 7 are the color font data segment storage region 5R for red, the color font data segment storage region 5G for green, and the color font data segment storage region 5B for blue.

Change of part of the segment storage regions 5R, 5G and 5B to the change storing region 7 is carried out by a mapping process which is produced during data storage in the read-only memory 1. The mapping process for color font data is carried out as a block of data.

Even though the program storing region 2 and font data storing region 3 are shown to be provided in adjacent storage regions in FIG. 1A, the present invention is not limited in such a construction. For example, the font data storing region may be located in a region distant from the program storing region in a memory having a larger storage region.

Figure 2:
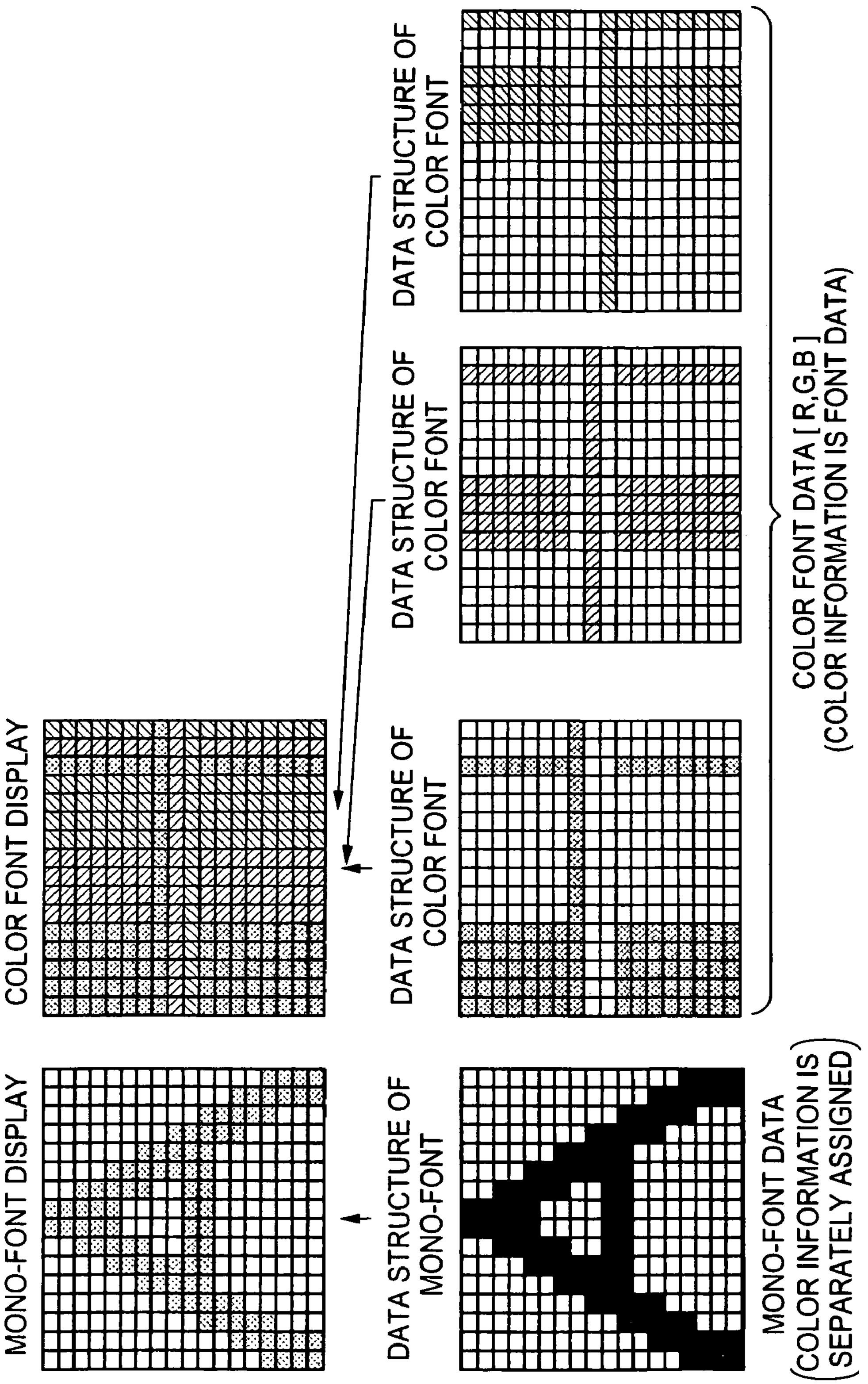
FIG. 2 is an illustration schematically showing an example of data structure of the second embodiment of a font memory for display according to this invention.
Figure 3:
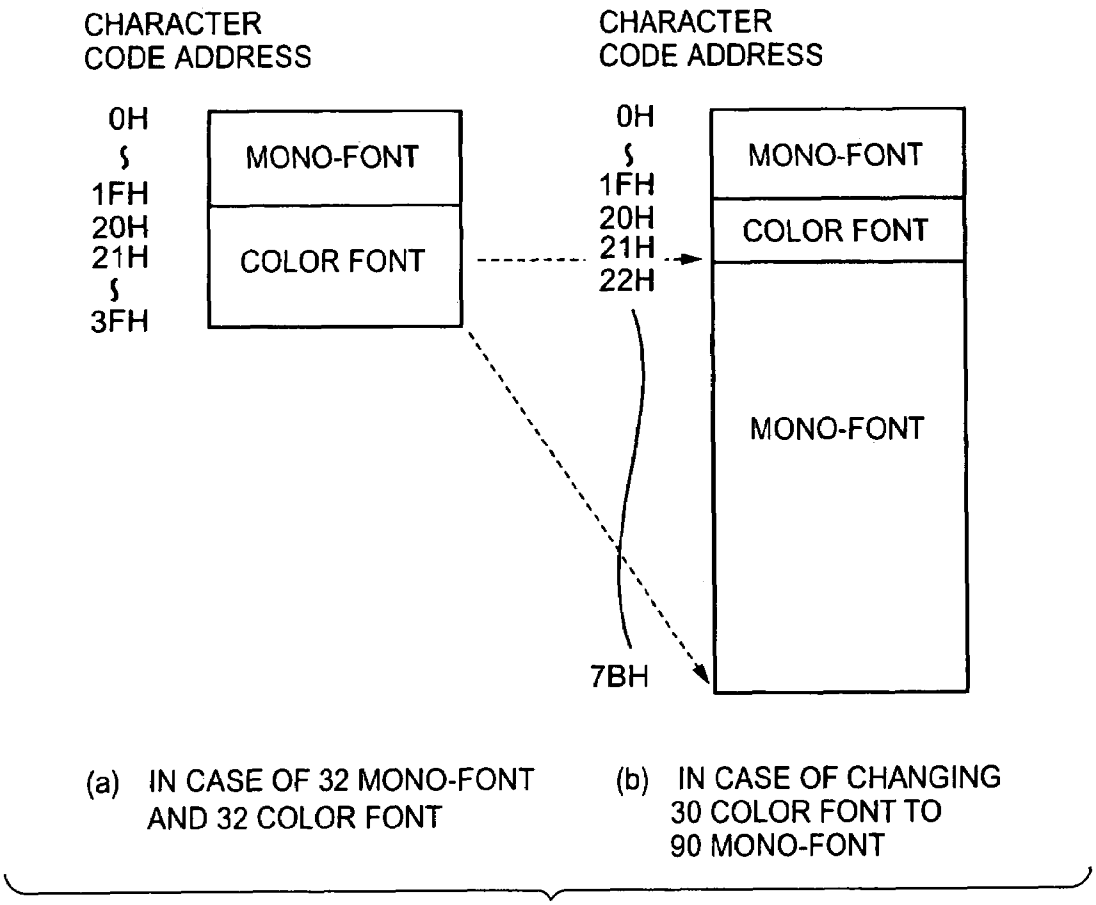
FIG. 3 is an illustration showing a CRA code of (b) the second embodiment of a font memory for display according to this invention, in comparison with (a) an original CRA code address.
Figure 4:
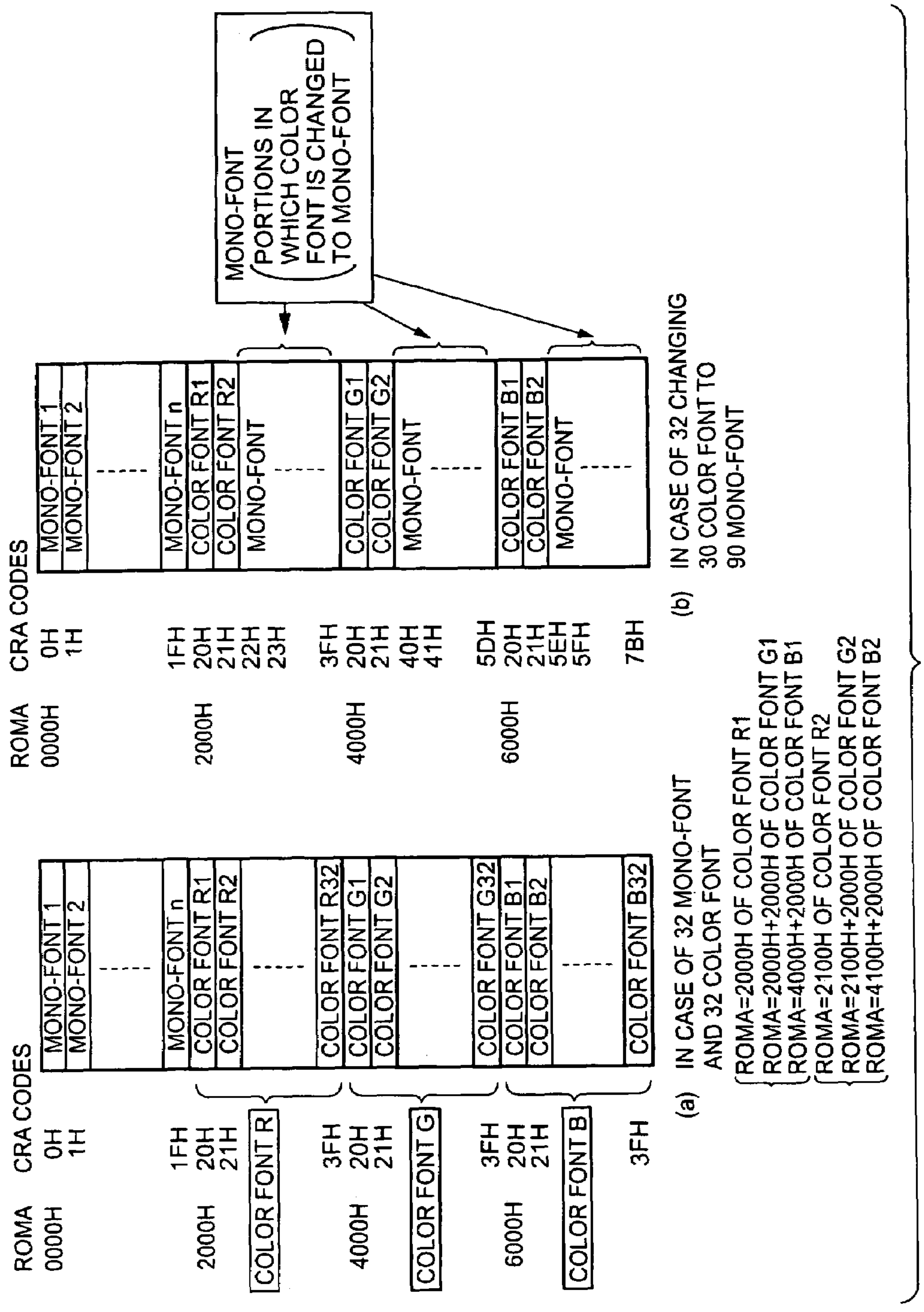
FIG. 4 is an illustration showing a mapping of a CRA code of (b) the second embodiment of a font memory for display according to this invention, in comparison with (a) an original CRA code address.

Referring to FIGS. 2 through 4, as a more detailed embodiment of the font memory for display in the first embodiment with the above described basic construction, the second embodiment of a font memory for display according to the present invention will be described below.

As shown in FIG. 2, a mono-font display is produced from a kind of font data, and a color font display is produced from three kinds (R, G, B) of font data. For example, as shown in FIG. 2, if mono-font data show an alphabetical capital letter A, the mono-font data are expressed by the presence of pixels indicating the shape of the letter, specifically by the fact that pixels are stippled or are not stippled. On the other hand, in the color font display, color information of R, G and B is used as font data, and an example of display of a color font is formed in accordance with an example of a data structure of each of color font data of R, G and B, the color font being used for expressing a pattern which can not be expressed by a mono-font.

FIGS. 3(*a*) and 3(*b*) show an example of a map of character codes, and FIGS. 4(*a*) and 4(*b*) show an example of a map of fonts. The fonts expressed by OSD are assigned by character codes (which will be hereinafter referred to as CRA codes). On the basis of the CRA codes, a ROM address for a font to be displayed (which will be hereinafter referred to as ROMA) is produced.

As shown in FIG. 3(*a*), if the number of mono-fonts is thirty two and the number of color fonts is thirty two, it is assumed that codes for mono-fonts are arranged at addresses 0H to 1FH of CRA codes and codes for color fonts are arranged at addresses 20H to 3FH of CRA codes. In this case, the correspondence between the CRA codes and the ROM address (ROMA) for font is shown in FIG. 4(*a*). In FIG. 4(*a*), if the number of mono-fonts is thirty two and the number of color fonts is thirty two, three font data (ROMA: 2000H, 4000H, 6000H) are mapped for displaying a color font R1 (CRA code 20H). This is a conventional data mapping to the original display font ROM.

On the other hand, the mapping to the second embodiment of a font memory for display according to the present invention is carried out as shown in FIG. 3(*b*). In the second embodiment of a font memory for display according to the present invention, the addresses of color fonts are assigned to mono-fonts for increasing the number of mono-fonts. As shown in FIG. 3(*b*), the CRA codes of color fonts are only 20H and 21H, and thirty addresses of CRA codes 22H to 3FH are changed to storage regions for storing therein mono-fonts.

The maximum number of mono-fonts capable of being assigned may be three times as large as the number of color fonts. In FIG. 3(*b*), mono-fonts can be assigned to CRA codes 22H to 7BH. The mono-fonts assigned to CRA codes 22H to 7BH as shown in FIG. 3(*b*) are mapped in regions of CRA codes 22H to 3FH, 40H to 5DH and 5EH to 7BH, to which color fonts were assigned before changing the number of fonts. Therefore, as shown in FIG. 4(*b*), thirty color fonts can be changed and diverted to ninety mono-fonts.

Even though the second embodiment describes the case of mapping thirty two mono-fonts and thirty two color fonts, the present invention does not limit such a number. For example, the present invention may be applicable to several numbers of mono-fonts and color fonts each having an arbitrary number.

What is claimed is:

1. A font memory for a display comprising:

a read-only memory, wherein a storage region is divided into a program storing region and a font data storing region which is divided into a mono-font data storing region and a color font data storing region, for mapping and storing data (1) in the mono-font data storing region by corresponding first character codes to mono-font data, and (2) for mapping and storing data in three segment storage regions in the color font data storing region by corresponding second character codes which define characteristics of color font data of a set of three primary colors of red, green and blue, to color font data, wherein the three segment storage regions in the color font data storing region include a mono-font storage diversion changeable storage region that can store the color font data for one of the three primary colors, and that can be diverted to store therein additional mono-font data, by corresponding the second character codes to the mono-font data.

2. The font memory for a display as set forth in claim 1, wherein said mono-font storage diversion changeable storage region is provided in said font data storing region of a read-only memory element, and color font data having an area which is three times as large as that of mono-font data are diverted from said three segment storage regions capable of being stored.

3. The font memory for a display as set forth in claim 2, wherein said three segment storage regions diverted to said mono-font storage diversion changeable storage region are color font data segment storage regions for red, green and blue.

4. The font memory for a display as set forth in claim 3, wherein said program storing region and said font data storing region are provided in adjacent storage regions of the read-only memory.

5. The font memory for a display as set forth in claim 3, wherein basic color font data are stored in at least head storage place of each of said three segment storage regions for red, green and blue.

6. The font memory for a display as set forth in claim 5, wherein said color font data segment storage region for red includes a basic color font data storing head storage place for red and a change storing region for red, said color font data segment storage region for green includes a basic color font data storing head storage place for green and a change storing region for green, and said color font data segment storage region for blue includes a basic color font data storing head storage place for blue and a change storing region for blue.

7. The font memory for a display as set forth in claim 1, wherein, thirty two mono-fonts and thirty two color fonts are mapped, and only two character codes for color fonts are used, and thirty addresses of character codes for color fonts are diverted to ninety mono-font storing regions, the number of which is three times as large as the number of the address of character codes for color fonts.

8. The font memory for a display as set forth in claim 7, wherein said thirty character codes for color fonts are provided for red, green and blue, respectively, to provide ninety character codes in total.

9. The font memory for a display as set forth in claim 2, wherein said program storing region and said font data storing region are provided in adjacent storage regions of the read-only memory.

10. The font memory for a display as set forth in claim 2, wherein basic color font data are stored in at least head storage place of each of said three segment storage regions for red, green and blue.

11. The font memory for a display as set forth in claim 10, wherein said color font data segment storage region for red includes a basic color font data storing head storage place for red and a change storing region for red, said color font data segment storage region for green includes a basic color font data storing head storage place for green and a change storing region for green, and said color font data segment storage region for blue includes a basic color font data storing head storage place for blue and a change storing region for blue.

12. The font memory for a display as set forth in claim 2, wherein, thirty two mono-fonts and thirty two color fonts are mapped, and only two character codes for color fonts are used, and thirty addresses of character codes for color fonts are diverted to ninety mono-font storing regions, the number of which is three times as large as the number of the address of character codes for color fonts.

13. The font memory for a display as set forth in claim 12, wherein said thirty character codes for color fonts are provided for red, green and blue, respectively, to provide ninety character codes in total.

* * * * *